United States Patent [19]
Farazandeh et al.

[11] 4,148,203
[45] Apr. 10, 1979

[54] COMPUTER-CONTROLLED PRESS BRAKE

[75] Inventors: Assadollah Farazandeh, Aurora; Buford R. Everett, Indian Head Park, both of Ill.

[73] Assignee: Dreis & Krump Mfg. Co., Ill.

[21] Appl. No.: 840,315

[22] Filed: Oct. 7, 1977

[51] Int. Cl.² ............................................. B21D 5/02
[52] U.S. Cl. ...................................... 72/21; 100/46; 100/48
[58] Field of Search .................. 72/21, 22, 7; 100/46, 100/48

[56] References Cited
U.S. PATENT DOCUMENTS

| | | | |
|---|---|---|---|
| 2,958,199 | 11/1960 | Anderson et al. | 100/46 |
| 3,044,389 | 7/1962 | Rexford | 100/48 |
| 3,618,349 | 11/1971 | Roch | 72/22 |
| 3,826,119 | 7/1974 | Marotto | 72/7 |
| 4,062,213 | 12/1977 | Schneider et al. | 72/21 |

*Primary Examiner*—Lowell A. Larson
*Attorney, Agent, or Firm*—Lockwood, Dewey, Alex & Cummings

[57] ABSTRACT

A computer-controlled hydraulic press brake includes an actuator and control system which automatically provides variable pre-programmable ram opening and closing strokes. A microprocessor within the control system responds to stroke parameters entered by the operator and an encoder-generated signal indicative of ram position to generate a velocity command signal defining a velocity profile for positioning the ram to the stroke limits. Closed-loop servo systems associated with each ram cylinder respond to the velocity command signal to cause movement of the ram in accordance with the velocity profile. A ram leveling circuit responsive to individual position sensors associated with respective sides of the ram compensates for ram tilt by simultaneously applying complimentary correction signals to the respective servo systems. A second velocity profile may be generated in response to stored parameters to position a back gauge concurrently with ram movement by means of a second motor drive servo system.

17 Claims, 15 Drawing Figures

COMPUTER-CONTROLLED PRESS BRAKE

BACKGROUND OF THE INVENTION

The present invention relates in general to press brake machines, and more particularly to an automated control and actuator system for such machines whereby press strokes of various predetermined limits and speeds can be automatically accomplished in sequence.

Press brake machines generally consist of an upstanding frame to the bottom end of which a horizontal bed plate is mounted, and to the top end of which a pair of hydraulic cylinders are mounted to reciprocatively drive a ram downward against the bed. In operation, the ram and bed are fitted with coacting dies and a work piece to be formed or sheared is placed between the dies. Upon actuation of a hand-controlled switch or foot pedal by the operator, hydraulic power is supplied to the cylinders to bring the ram down with sufficient force to cause the dies to perform the desired forming or shearing operation.

In practice, it is frequently desirable to perform successive bending operations on a sheet metal work peice wherein one or more bends are made with the upper movable die advancing and retracting to particular predetermined locations with respect to the lower fixed die, and wherein one or more additional bends are made with the movable die advancing and retracting to different predetermined locations relative to the lower die. Moreover, it is desirable that the sequence of bending operations be accomplished automatically, without the need for the operator to effect a different set-up prior to each bending operation.

For optimum operating efficiency, it is also desirable that the ram advance initially at a relatively fast speed until the upper die nears contact with the work piece, then slow to a lower pressing speed as the die actually engages the work piece and performs the desired forming or shearing operation. Furthermore, it is desirable that the ram pressing speed be varied according to the demands of the particular bending or shearing operation being performed. For example, it is often possible to advance the ram at a higher pressing speed for a shallow bend in relatively light gauge material, whereas a slower pressing speed is required for acute bends in heavy gauge material.

Various automatic control systems have been provided for obtaining one or more of these operational features in prior art programmable hydraulic press brake machines. However, such systems have typically been in the form of "add on" basically "open loop" systems intended to take the place of the multiple limit switches provided for ram control on the press brakes, and as such have not provided the degree of programminng flexibility and ram control obtained with the present system.

In contrast, in the apparatus of the present invention, which operates on a continuous closed loop principle, length of down stroke, length of return stroke, length of pressing stroke, and pressing speed parameters are all automatically established for each stroke in a multi-stroke pressing operation without the necessity for intervening operator adjustment. In addition, the apparatus of the present invention provides means whereby these parameters can be readily programmed, and whereby modifications in the program including the repeat of one or more strokes in the pressing operation can be readily accomplished. Moreover, the apparatus of the invention has the ability to idle or hold the ram stationary at any desired position along its path of travel, and to maintain the ram level notwithstanding load variations during the pressing stroke.

SUMMARY OF THE INVENTION

Generally stated, in a typical embodiment of the present invention a hydraulic press brake of the type having a frame, a bed and a ram disposed to reciprocate on the frame above the bed, incorporates an actuator and control system comprising drive means for driving the ram along the operating path at a velocity dependent on an applied control signal, ram position sensing means providing an output signal indicative of the instantaneous position of the ram, and control means responsive to the position-indicative output signal for generating a ram velocity command signal for application to the drive means whereby the ram is moved to the predetermined position.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
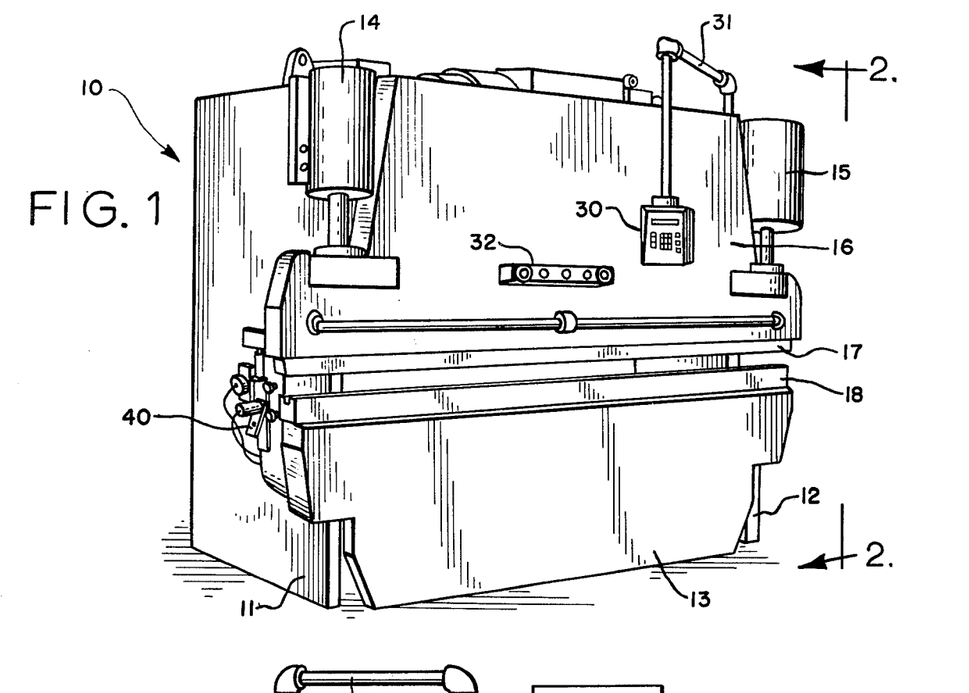
FIG. 1 is a perspective view of a press brake incorporating a hydraulic actuator and control system constructed in accordance with the invention.
Figure 2:
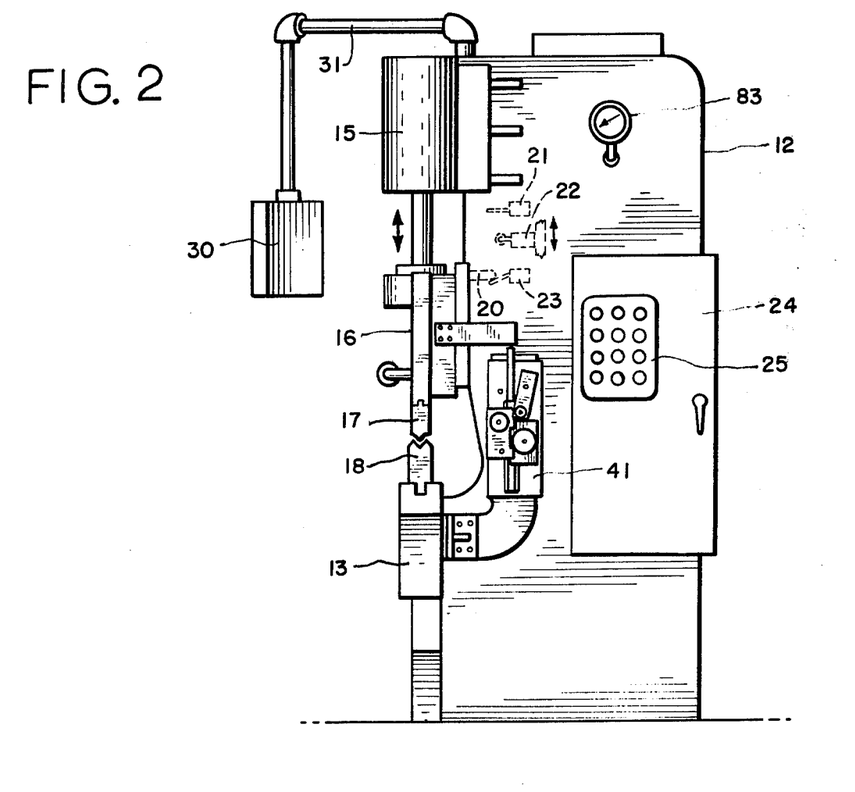
FIG. 2 is a side elevation view of the press brake of FIG. 1.

Referring to the figures, and particularly FIGS. 1 and 2, a press brake 10 constructed in accordance with the invention is seen to be conventional in design and construction to the extent that it includes a pair of heavy spaced-apart upstanding side plates 11 and 12 which are joined at their bottom ends by a bed plate 13. A pair of hydraulic cylinders 14 and 15 are mounted at the top ends of side plates 11 and 12, respectively. The pistons of these cylinders are connected to a movable ram 16 which is constrained by the pistons to reciprocate along a predetermined path extending from the cylinders to the top surface of the bed plate. An upper die 17 is secured to the bottom edge of ram 16 and a lower die 18 is secured to the top of bed 13 to exert force on a work piece positioned between the dies. While the dies may be of various shapes and sizes, they normally are structured to coact when brought into engagement under pressure to accomplish a forming or shearing operation on an intervening work piece. The two dies are readily changeable by the operator to accommodate specific job functions.

Referring to FIG. 2, ram 16 has an actuator arm 20 attached to it which extends to the rear of the press brake parallel to the outside surface of side plate 12. This actuator arm is utilized to actuate three limit switches associated with the control system of the ram; namely, a top limit switch 21, a reference limit switch 22, and a bottom limit switch 23. Each of these limit switches is connected by electrical able (not shown) to an electrical junction box 24 within which the computer and major electrical comonents of the control system are housed. A control panel 25 mounted on the top cover of junction box 24 provides a convenient location for certain operator-accessible controls.

To provide means by which operating modes and parameters can be conveniently set by the operator a second control panel 30 is suspended beside the operator by an overhead support structure 31. This control panel includes operator input switches and readout devices, and these are electrically connected with the computer within housing 24 by means of electrical cables (not shown) within the overhead support. An additional control panel 32 on the front surface of ram 16 contains palm-actuated switches which must be simultaneously actuated by the operator during operation of the press brake, as well as other controls incident to operation.

Figure 3:
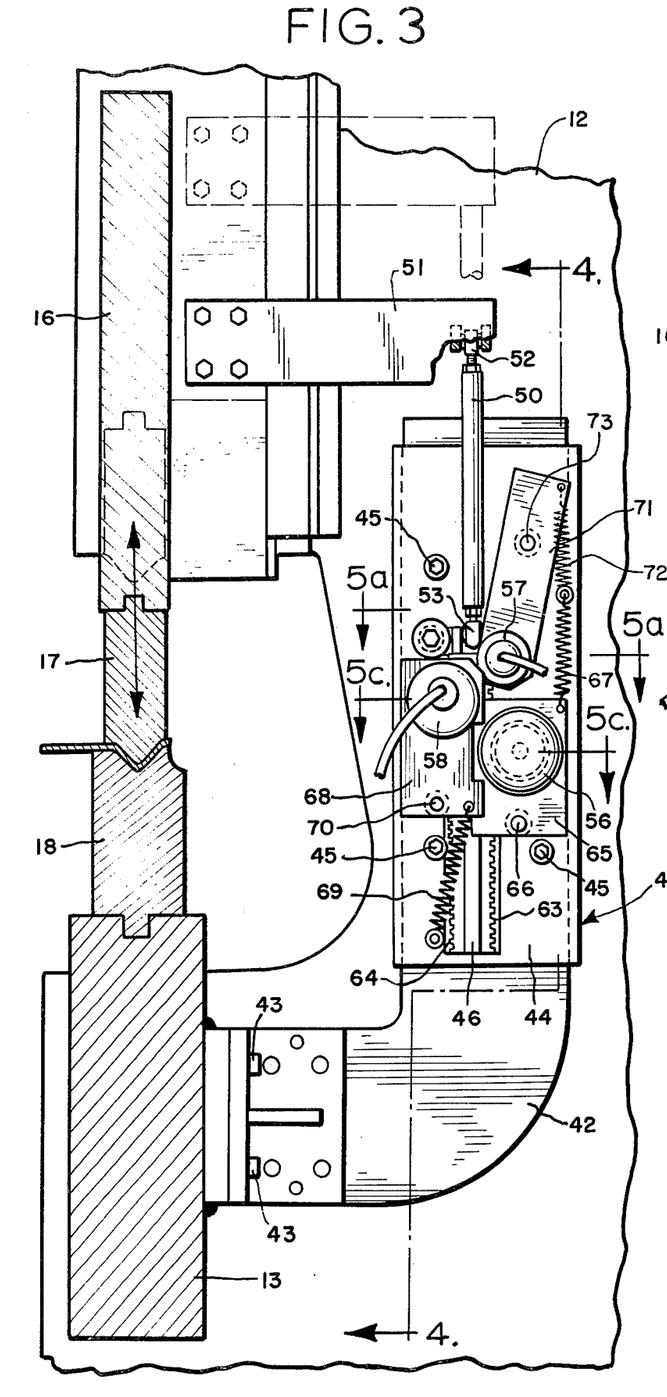
FIG. 3 is a front elevational view of one ram position sensor assembly utilized in the press brake.
Figure 4:
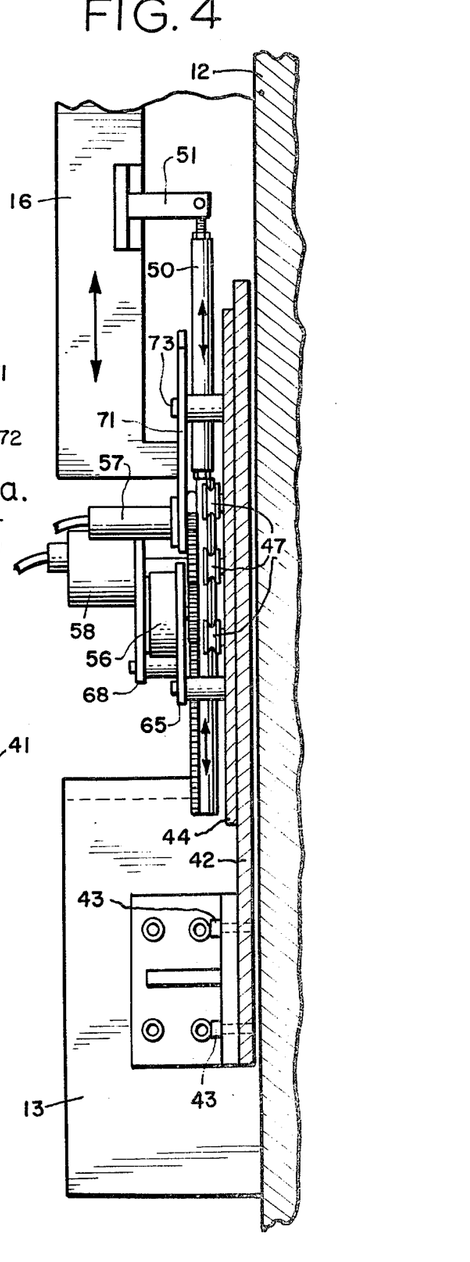
FIG. 4 is a cross-sectional view of the ram position sensor assembly taken along line 4—4 of FIG. 3.
Figures 5A, 5B:
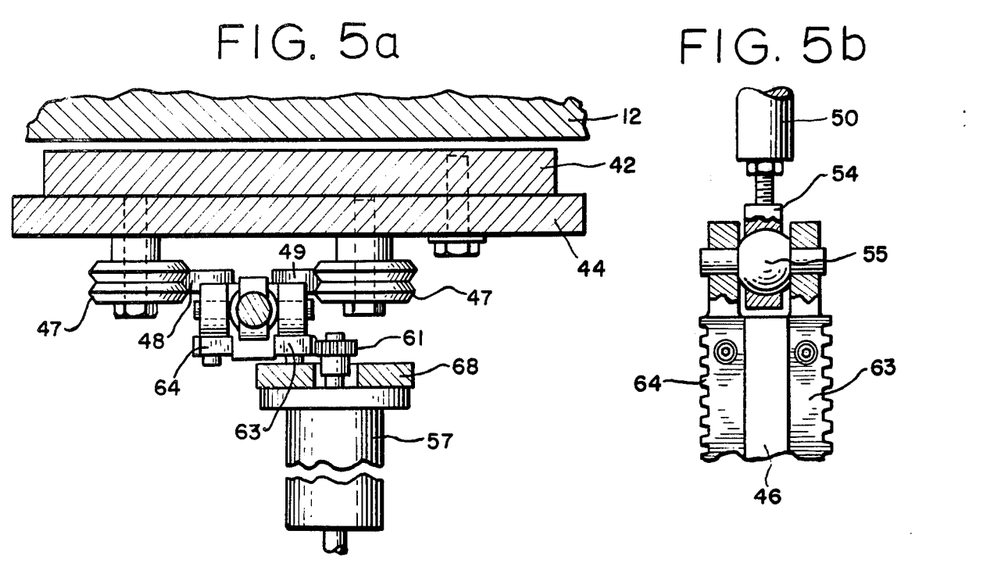
FIG. 5a is a cross-sectional view of the ram position sensor assembly taken along line 5a—5a of FIG. 3.
FIG. 5b is a cross-sectional view of the ram position sensor assembly taken along line 5b—5b of FIG. 3.
Figure 5C:
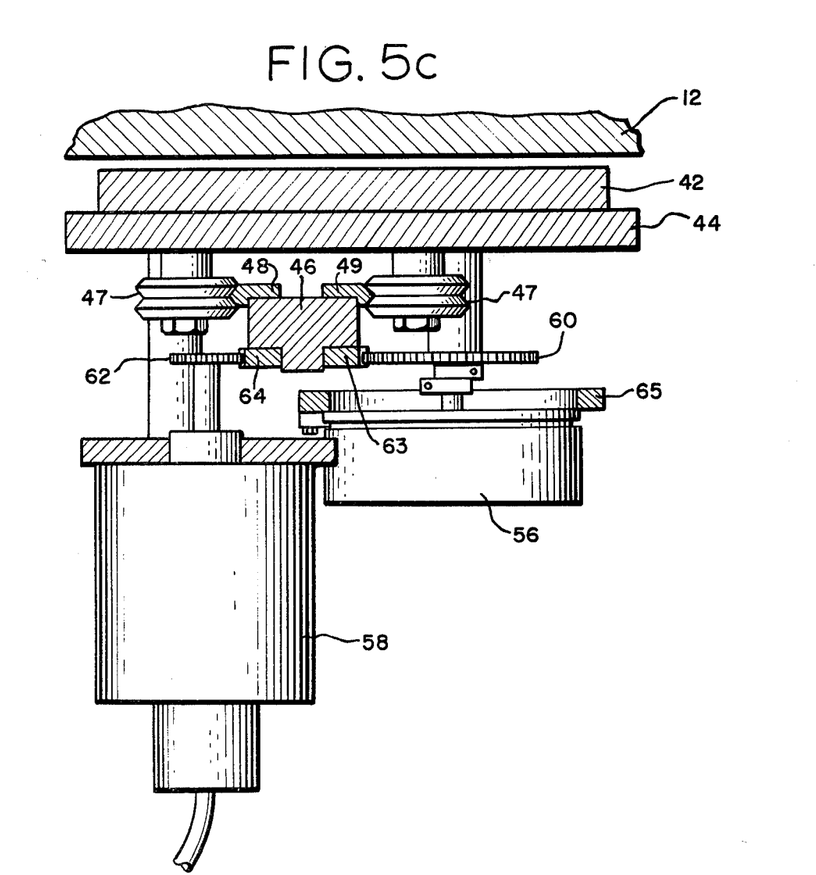
FIG. 5c is an enlarged front elevational view partially in cross section of the pivotal connection utilized in coupling the ram position sensor assembly to the ram.

In acordance with one aspect of the invention, the position of the reciprocatively mounted ram 16 is continuously monitored by means of right and left-hand ram position sensor assemblies 40 and 41 mounted along the outside surfaces of side plates 11 and 12, respectively. Referring to FIGS. 3-5, the right-hand sensor assembly 41 associated with side plate 12 is seen to be mounted on a J-shaped bracket 42 rigidly attached at its bottom end to bed plate 13 by machine screws 43 or other appropriate fastening means. The ram position encoder 41 includes a base plate 44 mounted to the surface of bracket 42 by means of a plurality of machine screws 45. An elongated slide member 46 is mounted for vertical reciprocation by means of a plurality of grooved pullies 47 (FIGS. 5a and 5b) set in spaced-apart relationship so as to engage strip-shaped runners 48 and 49 carried along the bottom edges of the rack.

To cause slide member 46 to move with ram 16 the upper end of the member is connected to the ram by means of a connecting link 50 and actuator arm 51. To prevent nonvertical movement or warping of the ram under heavy pressing loads from being transferred to member 46, line 50 is connected at its ends by means of swivel connectors 52 and 53, respectively. Each of these swivel connectors, as best seen in FIG. 5c, includes a collar portion 54 rigidly attached to a respective end of link 60, and a rotatably decoupled center ball-shaped portion 55 attached to the driving or driven member.

Electrical output signals indicative of the velocity and position of the ram are provided by a potentiometer 56, a tachometer 57 and an encoder 58. These components each include an input shaft on which respective ones of gears 60, 61 and 62 are mounted. Rotary motion is imparted to the shafts with movement of ram 16 by operatively engaging the gears to elongate toothed rack members 63 and 64 carried on respective sides of slide member 46.

To maintain gear 60 of potentiometer 56 in positive engagement with rack member 63, potentiometer 56 is mounted on a plate 65 pivotably mounted at 66 to base 44. A spring 67 between the plate and the base biases the gear into engagement with rack 63. Similarly, tachometer 57 is mounted on a plate 68 biased by a spring 69 about a pivot 70, and encoder 58 is mounted on a plate 71 biased by a spring 72 about a pivot 73.

The combination of the positive referencing of base plate 44 to bed 13 by the cantilever support bracket 42 and the isolation provided by the double-journaled link 50 provide a very accurate sensing of ram position substantially unaffected by wraping of the ram or frame during the pressing process. Yet, the assembly is simple in construction and operation and the individual components thereof can be readily removed for calibration or repair.

The ram position sensor 40 associated with the left frame plate 11 is essentially identical to ram position sensor assembly 41 except that it does not include an encoder 58. For this reason only the right-hand position sensor assembly has been shown herein.

Figure 6:
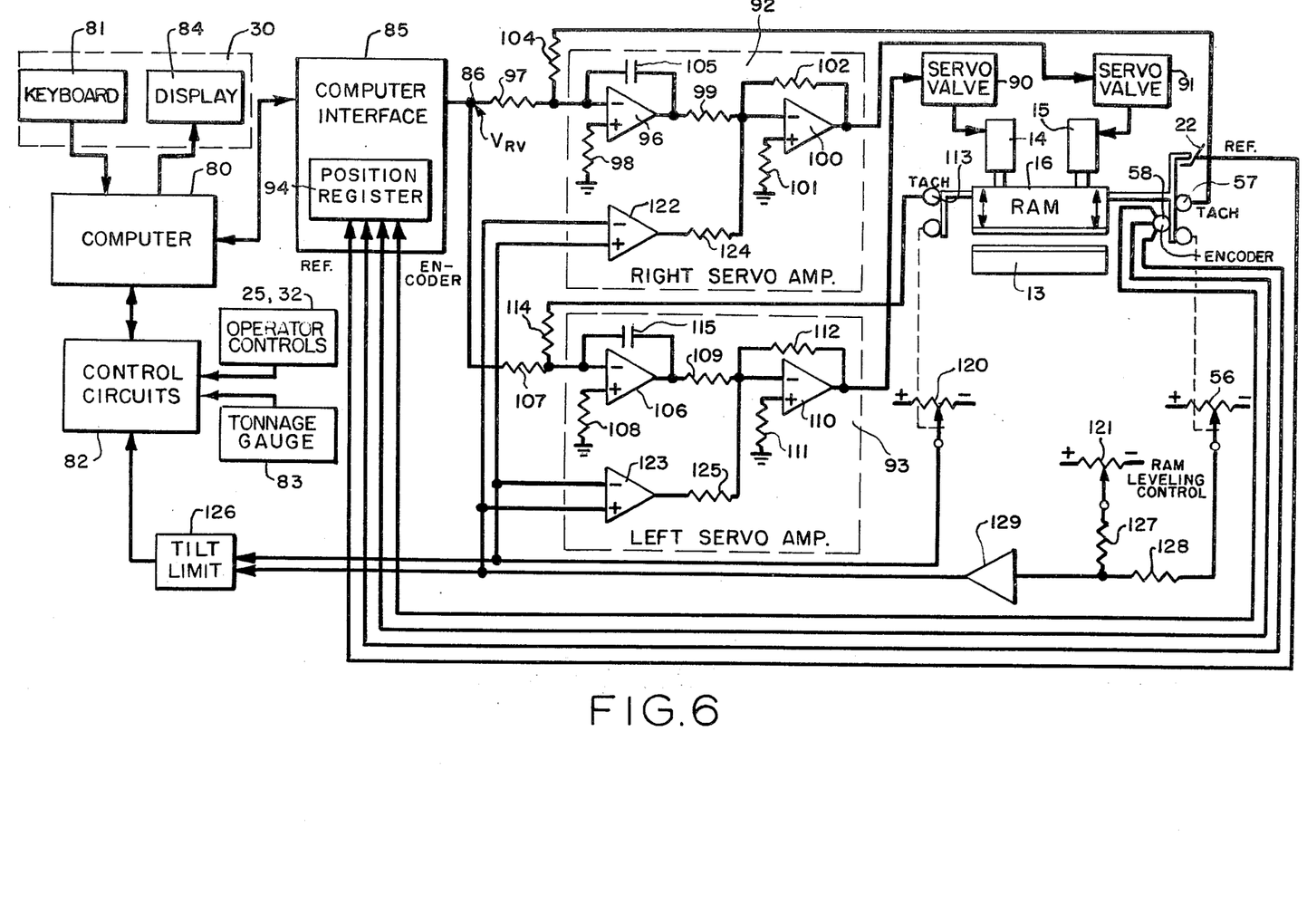
FIG. 6 is a functional block diagram partially in schematic form illustrating the principal elements of the press brake control system.

Referring to FIG. 6, the control system for press brake 10 is seen to include in accordance with another aspect of the invention a computer 80, which may be of a general purpose type suitable for control use and appropriately programmed in the manner herein described. Typically, the computer may incorporate one or more microprocessor units together with associated power supply, interface and control units necessary for the described operation. Inputs to the computer are provided from a keyboard 81 included in control panel 30, and from control circuits 82 contained within the electrical equipment cabinet 24. Control circuits 82, which include relays and solid state switching devices for controlling the application of electrical power to the various components of the press brake, as well as overload protection for these components, respond to output signals from computer 80, control panels 25 and 32, and an operator-adjustable tonnage meter 83. An output display 84 within control panel 30 driven by computer 80 provides the operator with a readout of the operating parameters of the press brake.

Computer 80 has associated with it a computer interface stage 85 which includes necessary circuitry for conversion of binary coded decimal (BCD) signals from the computer to analog signals useful in controlling the ram. As will be seen presently, upon receiving input parameters from keyboard 81, including ram advance and return limits and pressing speed for a stroke, computer 80 generates an output signal which defines a velocity profile for the ram during the stroke. This output signal, initially in BCD form, is converted within interface 85 to an analog ram velocity command signal $V_{RAM}$ at junction 86 useful in controlling the motion of the ram. Although this command signal may be either positive or negative polarity and may vary over a wide range of voltage levels, in one successful embodiment of the invention a range of ±10 volts is provided.

Control of ram movement is achieved by means of servo valves 90 and 91 which are connected in closed feedback loops with and respond to applied electrical signals from respective servo amplifiers 92 and 93 to control the application of hydraulic pressure to ram cylinders 14 and 15, respectively. In this way, the ram control signal $V_{RAM}$ generated by computer 80 at junction 86 conditions the servo amplifier to open valves 90 and 91 to achieve ram movement at the velocity level called for by the computer. Direction of movement is determined by the polarity of the command signal.

Within the right-hand servo amplifier 92 the computer-generated ram velocity command signal at junction 86 is applied to the inverting input of a first differential amplifier 96 through a series impedance 97. The nonadverting input is connected to ground by an impedance 98 and the output of amplifier 96 is connected through an impedance 99 to the inverting input to a second differential amplifier 100. The non-inverting input is connected to ground by an impedance 101 and the output of amplifier 100 is applied to servo valve 91. Degenerative feedback is provided for amplifier 100 by an impedance 102 connected between the output and inverting input of the amplifier.

Upon generation of a ram velocity command signal at junction 86, amplifiers 96 and 100 twice amplify and invert the signal with the result that an amplified signal is available for actuation of servo valve 91. This signal is opposed by the output of tachometer 57 which is applied to amplifier 96 through an impedance 104 to form a velocity-controlling feedback loop. A capacitor 105 connected between the output and non-inverting input of amplifier 96 serves to integrate the applied command signal to obtain a smooth response from the ram to sudden variations in the command signal.

In a similar manner, the analog command signal from junction 86 is applied to the inverting input of a first differential amplifier 106 in the left servo amplifier 93 through a series-connected impedance 107. The noninverting input is connected to ground through an impedance 108 and the output of amplifier 106 is connected through an impedance 109 to the inverting input of a second differential amplifier 110. The non-inverting input is connected to ground through an impedance 111 and the output of amplifier 110 is applied to servo valve 90. An impedance 112 connected between the output and inverting input provides degenerative feedback. A tachometer 113 associated with the left side of ram 16 develops an output signal which is applied to the inverting input of amplifier 106 through a series impedance 114, and an integrating capacitor 115 is connected between the output and inverting input of this amplifier to enhance system stability.

The operation of the left servo amplifier 93 is identical to that of the right servo amplifier 92. The computer generated ram velocity command signal is twice amplified and inverted prior to application to servo valve 90. A tachometer 113 provides a feedback signal in response to the instantaneous velocity of the ram which is subtracted from the command signal to provide a closed-loop system for responding to the command signal.

To provide computer 80 with an input indicative of the instantaneous position of ram 16 phased signals from encoder 58 are utilized to step a ram position register 94 within interface stage 85. The counting state of this register, which is indicative of ram position, is applied to computer 80 for use in the generation of subsequent command output signals therein.

In accordance with another aspect of the invention, the counting state of position register 94 is compared with a predetermined counting state as the ram passes an intermediate reference position in each pressing stroke. Sensing of ram passage at this position is accomplished by the limit switch 22 which causes a signal to be applied to interface stage 85 to affect the comparison. If the count in the position register is not within a specified tolerance, ±0.002 inches of 1.000 inch in one successful embodiment of the invention, a register error is indicated and further operation of the machine is terminated pending recalibration of the register by the operator. Although register 94 is shown incorporated in the computer interface stage, it can also be incorporated within the computer itself should this be advantageous from a programming point of view.

In accordance with another aspect of the invention, ram 16 is maintained level by means of a leveling system which includes first and second potentiometers 120 and 56 mechanically coupled to the left and right sides of the ram, respectively. These potentiometers are each connected to a source of voltage regulated unidirectional current such that an analog output signal is developed on the arms of each potentiometer indicative of the instantaneous position of the associated side of the ram. The output signal from potentiometer 120 is applied to the non-inverting input of a third differential amplifier 122 in the right servo amplifier 92, and to the inverting input of a third differential amplifier 123 in the left servo amplifier 93. The signal developed by potentiometer 56 is applied to the inverting input of differential amplifier 122 and to the non-inverting input of differential amplifier 123.

Assuming the ram becomes titled with the right side lower than the left side, a correction signal is generated by amplifier 122 and applied through an impedance 124 to the inverting input of amplifier 100 wherein it is combined with the amplified compound signal from amplifier 96 to call for an upward adjustment by cylinder 15. At the same time, the output of amplifier 123 produces an output signal which is applied through an impedance 125 to amplifier 110 to call for lowering of the left side of the ram by cylinder 14. In this way, correction of a tilt condition is compensated for by simultaneously raising the low side and lowering the high side of the ram. As a result, correction time is reduced since only half as much movement is required of any one side of the ram as was required in previous systems wherein correction was made at only one side of the ram.

The signals developed by potentiometers 120 and 56 are also applied to a tilt limit detector 126 which continuously compares the signals to detect excessive tilt of the ram. Upon occurrence of tilt in excess of a predetermined limit, an output signal is generated by detector 126 and applied to control circuits 82 wherein further operation of the press brake is terminated pending manual reset of the circuit by the operator.

Provision is made for introducing a desired tilt to the ram by means of a ram leveling control 121. This control comprises an operator-adjustable potentiometer connected to a source of voltage regulated unidirectional current to provide an output signal dependent on its setting. This signal is combined with the signal developed by potentiometer 56 by means of impedances 127 and 128, and the resultant signal is amplified by an amplifier 129 prior to application to the servo amplifiers, wherein it is acted upon as if a tilt signal. As a result, the ram is maintained in the desired out-of-level condition throughout the pressing cycle.

Having considered the electrical portion of the control system, it remains to consider the hydraulics which energize the ram cylinders in response to the aforementioned electrical system control functions. Basically, and with reference to the simplified diagram of FIG. 7, the hydraulic system comprises a hydraulic pump 130 which is powered by a motor 131. This pump, which may be conventional in design and construction, removes hydraulic fluid from a sump or reservoir 132 and supplies it under high pressure to the various valves and hydraulic actuators of the system.

Figure 7:
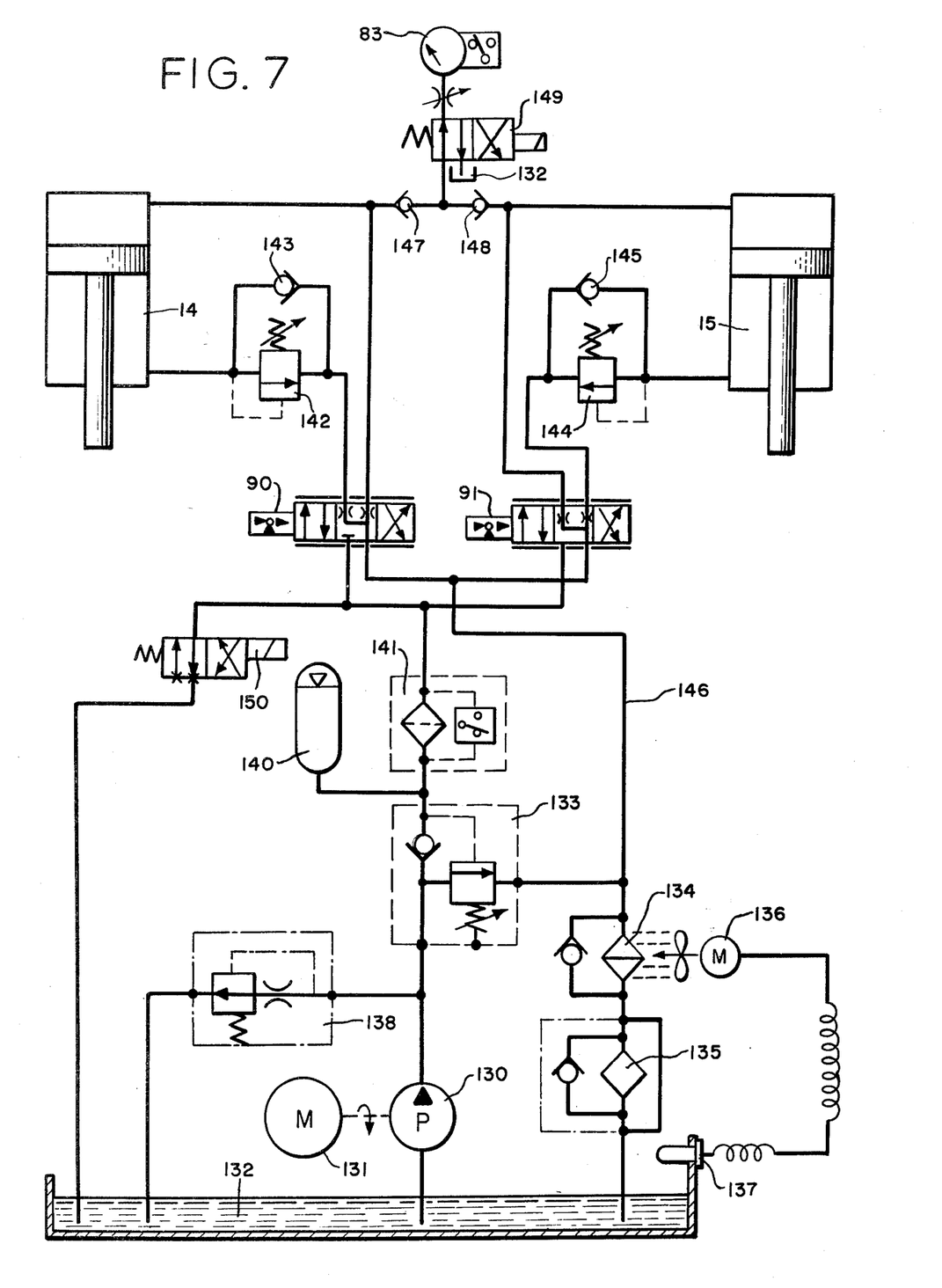
FIG. 7 is a simplified schematic diagram of the hydraulic system of the press brake.

The output of pump 130 is supplied to an off-loading relief valve 133 which opens as required to maintain a constant predetermined downline pressure, typically in the order of 3,000 psi. Fluid not required downline is bypassed through the valve to reservoir 132 by way of a heat-dissipating radiator 134 and an inline filter 135. Radiator 134 and filter 135 are bypassed by appropriate low pressure check valves so that fluid flow will not be interrupted in the event that one of these elements becomes blocked. Radiator 134 is cooled by means of an electrically driven fan 136, the operation of which is controlled by means of a thermostat 137. An air bleed valve 138 is provided at the output of pump 130 to bleed air in the system back to reservoir 132.

Downline of valve 133 the system includes an accumulator 140 which serves as a high pressure reservoir with respect to pressure from valve 133. An inline filter 141 is provided downline of the accumulator to filter the high pressure fluid prior to application to servo valves 90 and 91. A pressure switch associated with filter 141 provides an indication to the operator in the event of blockage of the filter.

The high pressure hydraulic fluid from filter 141 is directed by servo valve 90 to the upper and lower ports of hydraulic cylinder 14. Depending on the position of valve 90, fluid may be directed either to the bottom port of the cylinder to raise the left side of the ram, or to the top port of the cylinder to lower the left side of the ram. In the latter case, a counter-balancing valve 142 in series with the bottom port provides a controlled back pressure to enable the downward speed of the ram to be controlled. A check valve 143 bypasses this valve during the return stroke of the ram.

Similarly, the high pressure fluid from filter 141 is supplied by servo valve 91 to either the upper or lower ports of hydraulic cylinder 15. A counter-balancing valve 144 provides for controlled downward movement of the piston, and a check valve 145 bypasses the counter-balancing valve during the return stroke of the piston. In each case, the servo valves also serve to exhaust fluid from the cylinder port not receiving pressure through a drain manifold 146.

Servo valves 90 and 91 are designed so as to supply fluid to their respective hydraulic cylinders in response to very slight deflections of their control stems. With this high degree of sensitivity the servo valves continuously modulate the application of fluid to the cylinders, forming a closed-loop system through encoder 58 with the previously described electronic control system which continuously monitors and maintains the pistons in a desired position. This is unlike prior art automated press brake systems, wherein the application of hydraulic power to the ram cylinders was an on or off proposition with no attempt being made to modulate the application of pressure to the ram to achieve a desired velocity profile.

The pressing cycle is terminated by either the ram arriving at a predetermined depth, or by the pressing effort reaching a predetermined tonnage. In the hydraulic system check valves 147 and 148 provide pressure communication to the tonnage gauge 83 through a solenoid operated valve 149 which is momentarily actuated upon completion of each pressing cycle to relieve pressure from the tonnage meter in preparation for a subsequent pressure reading. A solenoid-actuated pressure dump valve 150 is provided downline of high pressure filter 141 to enable pressure within the hydraulic circuit to be instantaneously dumped in the event of a malfunction of the system.

Figure 8:
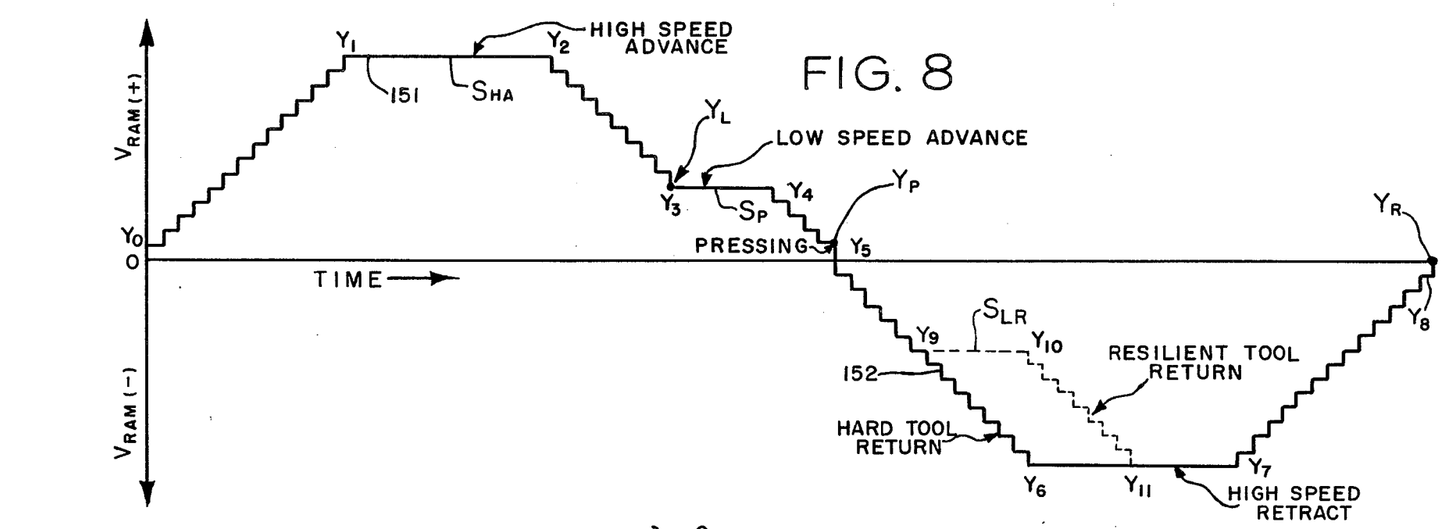
FIG. 8 is a depiction of a ram velocity control signal generated by the press brake control system useful in illustrating the functioning of the press brake.
Figure 9:
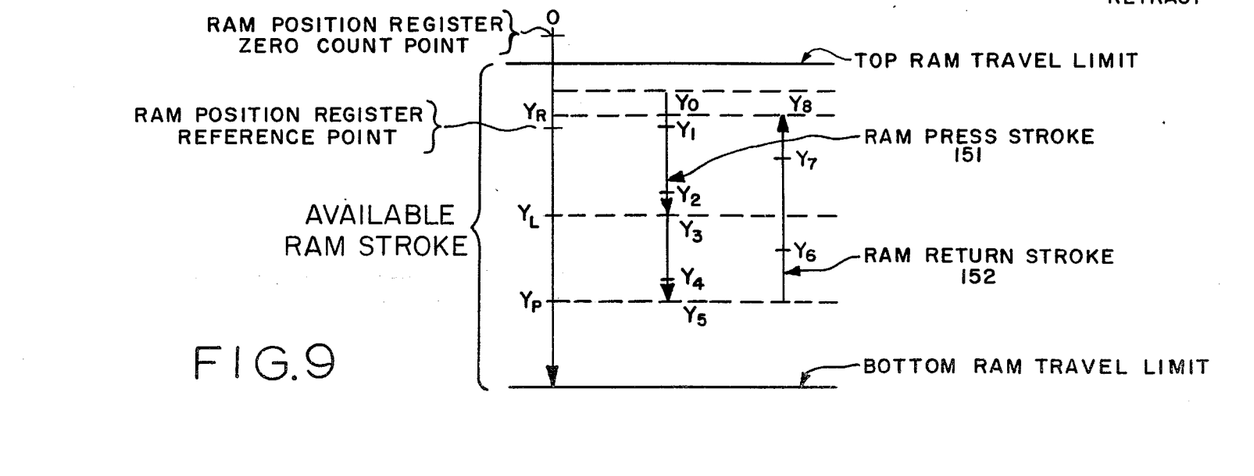
FIG. 9 is a simplified logic flow chart useful in understanding the functioning of the press brake control system.

A previously developed computer 80 generates a ram velocity command signal $V_{RAM}$ in response to stroke and pressing speed command signals entered into the computer through control panel 30. This function is illustrated in FIGS. 8 and 9, which illustrate the generation of $V_{RAM}$ for a typical pressing cycle having as parameters a pressing depth limit $Y_P$, a slow speed advance limit $Y_L$, and a retraction limit $Y_R$, and a pressing speed $S_P$. In generating $V_{RAM}$, the computer first computes the velocity profile of the stroke, including positions $Y_0$–$Y_8$ the ram will occupy at each velocity transition. Then, as seen in the waveform 151 of FIG. 8, stairstep components are generated to achieve the necessary accelerations and decelerations. In generating the stairstep components, the computer continuously monitors ram travel as recorded in register 94, stepping to the next highest level as each increment is traversed. When the ram reaches position $Y_1$, the pre-calculated point for high speed advance, the command signal remains constant and the ram proceeds at high speed to a second pre-calculated position, $Y_2$. At this point deceleration is accomplished by a decreasing stairstep signal until the ram reaches position $Y_3$, corresponding to the low speed advance point $Y_L$, at which time the velocity command signal remains constant and the ram proceeds at low speed to position $Y_4$. Further deceleration is called for at this point by a second decreasing stairstep function until the ram reaches position $Y_5$, corresponding to the pressing limit $Y_P$, or the tonnage gauge is actuated, whichever occurs first.

At this point, retraction of the ram is accomplished by generation of a negative plurality ram velocity command signal, as depicted by waveform 152. This signal causes the ram to accelerate in an upward direction until a pre-computed position $Y_6$ is reached, at which time the command voltage remains constant and the ram proceeds at high speed to a pre-computed position $Y_7$. A decreasing stairstep component now causes the ram to decelerate and stop at position $Y_8$, which corresponds to the operator-selected retraction limit $Y_R$.

When a resilient tool is being utilized an alternate retraction cycle may be employed. In this case acceleration is initially terminated at a position $Y_9$, and a lower retraction speed is maintained until position $Y_{10}$. At this point speed acceleration again occurs until the ram reaches its full retraction speed at position $Y_{11}$.

The high ram advance speed $S_{HA}$, the ram pressing speed $S_P$ and the ram retract speed $S_R$, as well as the ram positions $Y_0$–$Y_9$ upon arriving at and leaving each of these velocities, are determined from the initial operator data entries $Y_L$, $Y_P$, $Y_R$ and $S_R$. Together these parameters define a velocity profile for the ram which is tailored for performing the particular bending operation with maximum machine and operator efficiency.

It will be appreciated that the effect of the ram velocity command signal $V_{RAM}$ is to establish an input to servo amplifiers 92 and 93 which calls for the application of more hydraulic pressure to the cylinders until counteracted by the feedback signal from tachometers 57 and 113. When the velocity of the ram is as called for by the velocity profile signal, a state of equilibrium is re-established and maintained until the velocity command signal $V_{RAM}$ again changes. As a result of this closed-loop configuration, the velocity of the ram follows the computer generated velocity profile signal very closely. During generation of the velocity profile signal $V_{RAM}$ computer 80 continuously monitors the position of the ram by means of ram position register 94 to confirm that each command in the profile is being carried out.

Figure 10:
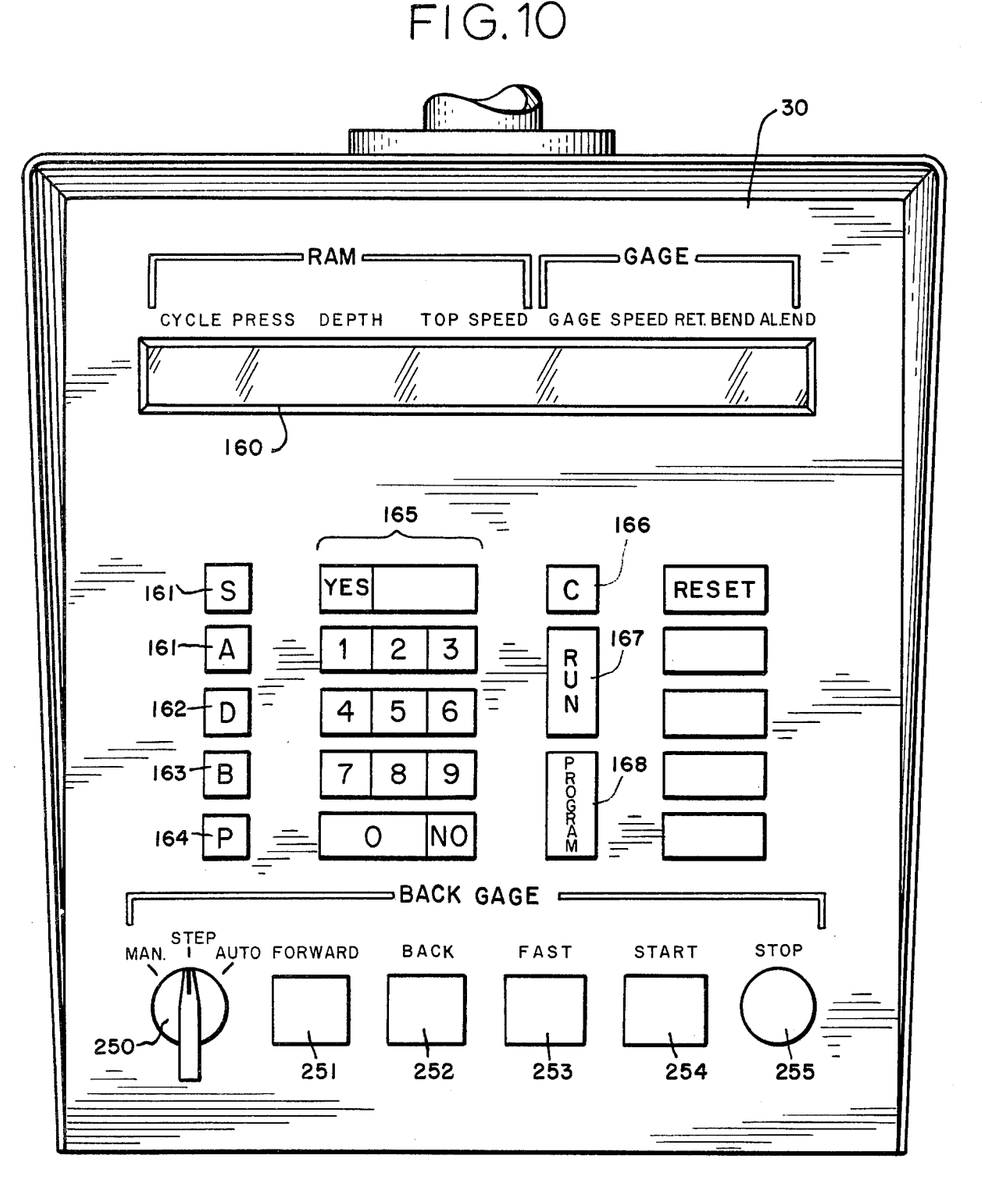
FIG. 10 is a front elevational view of a control panel of the press brake.

The control panel 30 provided for operator inputs to computer 80 incorporates a number of useful features and functions which significantly simplify operation and reduce operator programming time requirements. Referring to FIG. 10, the control panel is seen to include a digital display panel 160 on which the parameters associated with each program step are displayed. As previously developed, these parameters include the number of the particular cycle in the pressing sequence, the pressing or ram slow-down point ($Y_L$ in the illustrated press cycle), the pressing depth ($Y_P$), the retraction distance ($Y_R$) and the pressing speed ($S_P$). In one successful embodiment of the invention, twenty program steps were provided and pressing speeds of from zero to forty inches per minute were provided in increments of five inches per minute. In addition to digital display panel 160, a number of mode control switches are provided on the panel. Switch 161 selects either inch or metric system units, with conversion from one system to the other being automatically accomplished. Switch 162 provides for introducing new parameters into the system. Actuation of this switch results in the parameters being registered one at a time on the display screen, with the previously entered parameter being displayed as a preliminary response. Switch 162 calls for a display to the next program step; i.e., to the next one of the twenty program steps available. Switch 163 allows a bend allowance to be automatically entered, and switch 164 allows the operator to advance from one program step to another. A set of push buttons 165 is provided for entry of numeric data as well as yes and no entries required in programming. Switch 166 provides a clear function which erases previously entered data. Switch 167 and switch 168 condition the computer to run and programming modes, respectively.

Figure 11:
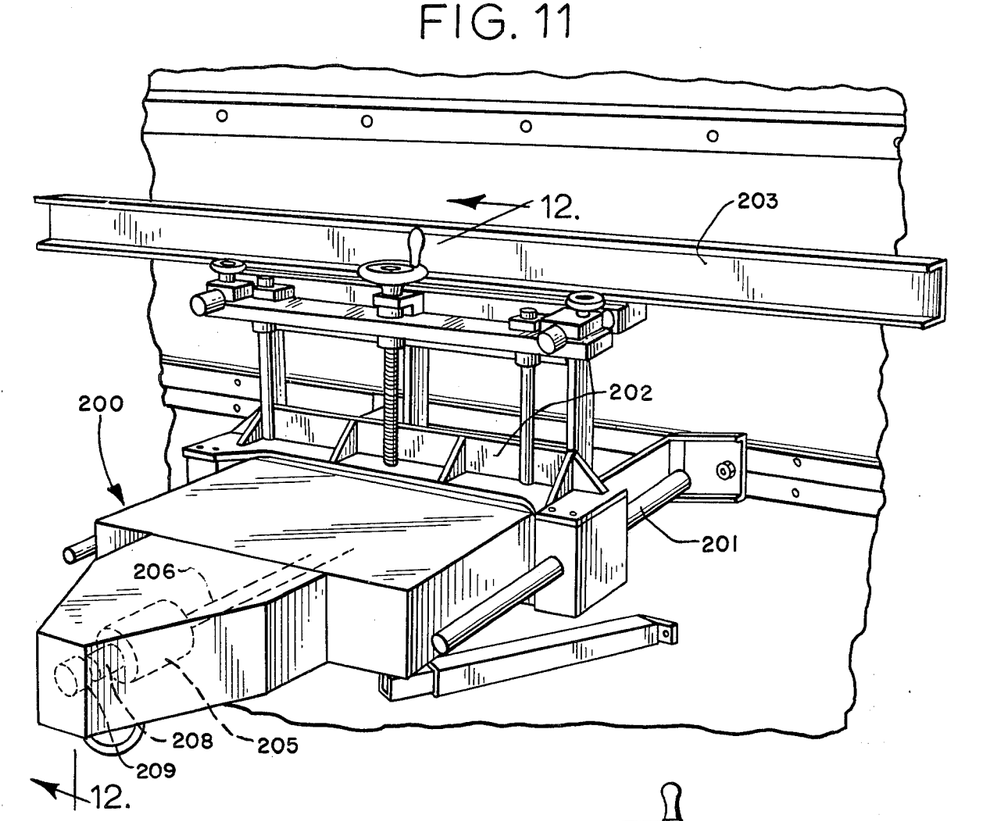
FIG. 11 is a perspective view of the automatic back gauge of the press brake partially broken away to illustrate the principal elements thereof.
Figure 12:
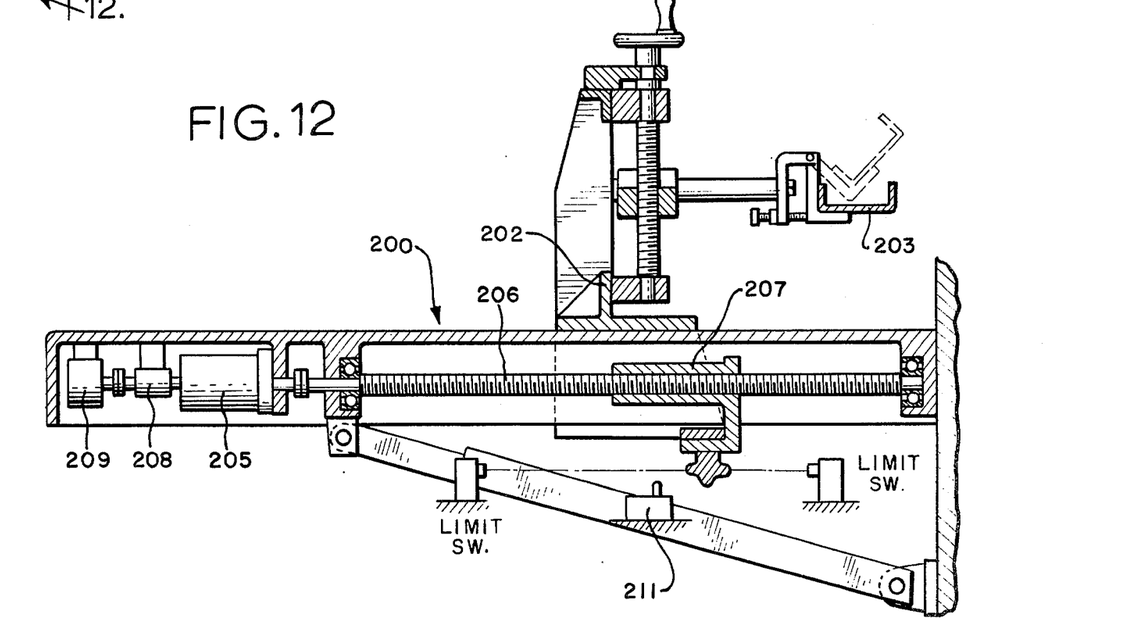
FIG. 12 is a side elevatonal view of the back guage partially broken away to show the principal elements thereof.

Referring to FIGS. 11 and 12, the press brake may also incorporate a back gauge 200 which provides an automatically positioned stop to assist in positioning work pieces between the dies of the press brake. Basically, this back gauge comprises a frame 201 attached to the rear of the press brake on which a carriage 202 is slidably mounted for reciprocation toward and away from the press brake bed. The carriage carries a stop plate 203 against which the work is positioned. A crank-operated lead screw 204 on the carriage allows the height of the stop plate to be manually positioned by the operator. The carriage is automatically positioned at preset distances from the press brake bed by means of a servo motor 205 which rotatably drives a lead screw 206. A collar 207 engaged to the lead screw carries the carriage into the desired position. An encoder 208 and tachometer 209 are rotatably coupled to the lead screw.

Figure 13:
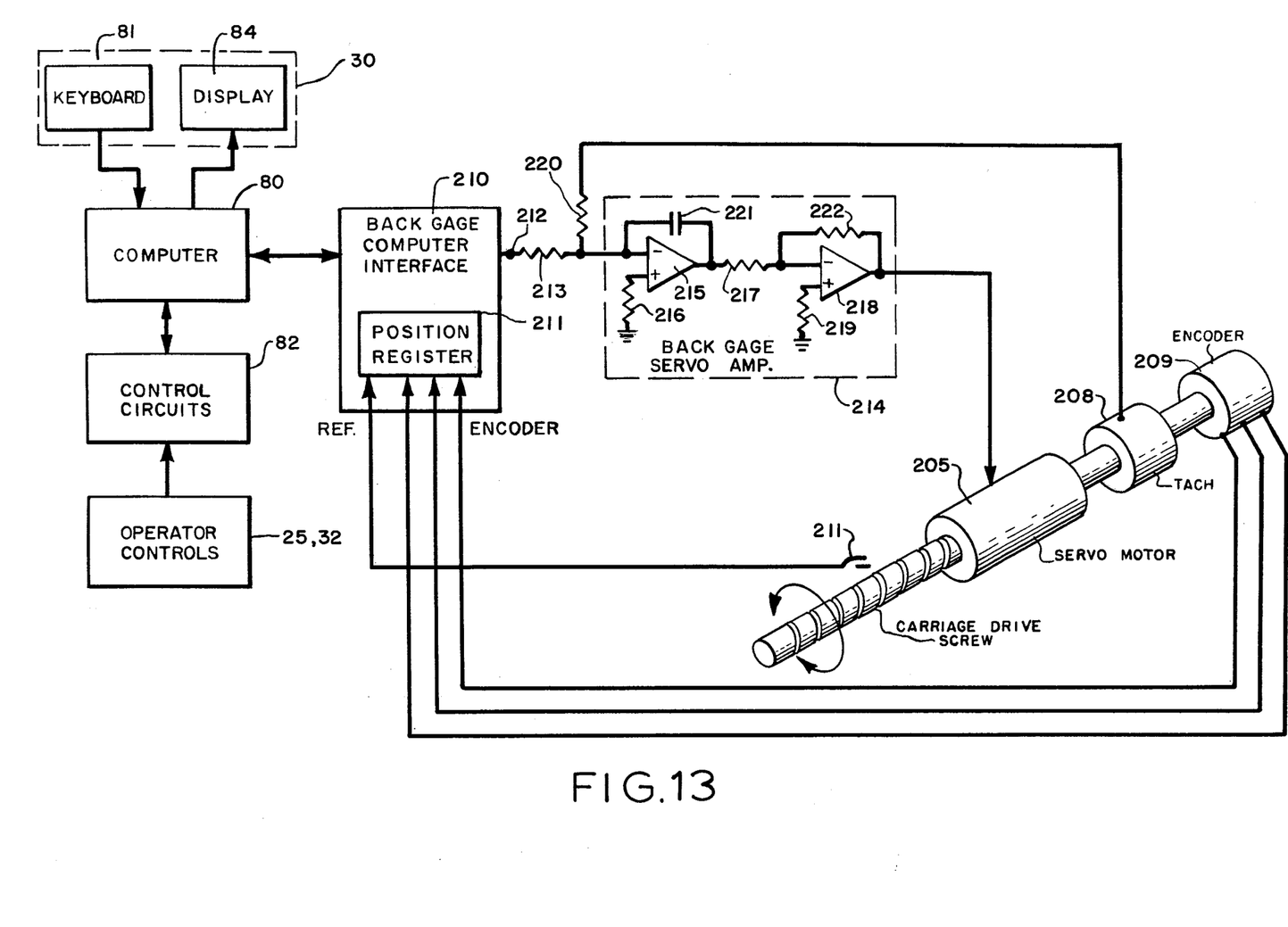
FIG. 13 is a functional block diagram partially in schematic form illustrating the operation of the press brake control system with respect to the automatically positioned back guage of FIG. 11.

Operation of the lead screw is accomplished by computer 80 in a manner similar to control of the press brake. Referring to FIG. 13, computer 80 is provided with a second computer interface stage 210. A carriage position register 211 is provided within interface stage 210 and is connected to receive phase signals from encoder 209. Upon rotation of the carriage drive screw encoder 209 steps register 211 to maintain a counting state indicative of the instantaneous position of the carriage. As with the ram, a reference switch 212 is provided at a location intermediate the front and rear travel limits of the carriage to provide a comparison signal by which the validity of the counting state within the back gauge position register 211 can be ascertained.

Simultaneously with generation of the velocity profile $V_{RAM}$ for ram 16, computer 70 generates a second velocity profile signal $V_{GAGE}$ at junction 212 which commands movement of the back gauge to selected positions X1–XN corresponding to the particular pressing operation being performed. This signal is applied through an impedance 213 to a back gauge servo amplifier 214.

Within servo amplifier 214 the command signal is applied to the inverting input of a first differential amplifier 215. The non-inverting input is connected to ground through an impedance 216 and the output of this amplifier is connected through an impedance 217 to the inverting input of a second differential amplifier 218. The non-inverting input is connected to ground by an impedance 219 and the output amplifier 218 is applied to servo motor 205. As in the previously described press brake control circuit, the output of tachometer 208 is applied through an impedance 220 to the inverting of input 215 so as to form a closed feedback loop which stabilizes upon the lead screw reaching command velocity. A capacitor 221 connected between the output and inverting input of amplifier 215 provides stabilization to the servo loop. An impedance 222 connected between the output and the inverting input of amplifier 218 provides degenerative feedback for that device.

In operation, the back gauge functions similarly to the ram, with each change in profile signal level bringing about a corresponding change in carriage velocity as the output of tachometer 208 stabilizes the servo loop.

Returning to FIG. 10, readout 160 also provides readouts for back gauge position, back gauge speed, back gauge return position and bend allowance. A return parameter, which is merely entered as a yes (Y) or No (N), indicates whether the gauge is to return to its fully retracted position following the particular cycle. An end display is provided to indicate whether the particular sequence of operations has been completed. Gauge distances are referenced from the intermediate reference position, and the counting state of position register 211 increases with gauge movement toward the bed. Gauge speed is variable from 0–900 inches per minute, in increments of 100 inches per minute indicated by the numerals 0–9.

Manual controls for the back gauge are provided on instrument panel 30. A mode switch 250 permits selection of manual, step or auto modes. In the manual mode switches 251–255 permit the operator to manually position the back gauge to any desired position. In the step position the start switch 254 must be depressed to reposition the back gauge to its next programmed position. In the auto mode the back gauge is automatically positioned to the next preset position upon the ram reaching the top of its stroke.

While a particular embodiment of the invention has been shown and described, it will be obvious to those skilled in the art that changes and modifications may be made without departing from the invention and its broader aspects, and therefore, the aim in the appended claims is to cover all such changes and modifications as fall within the true spirit and scope of the invention.

We claim:

1. In a press brake of the type having a frame, a bed and a ram constrained to reciprocate along a defined operating path toward and away from said bed, a control and actuator system for moving said ram from a first position to a second predetermined position along said operating path, comprising, in combination:
   drive means for driving said ram along said operating path in response to an applied analog control signal, said drive means comprising a hydraulic actuator system associated with said ram and having at least one servo-vale proportionally responsive to said applied analog control signal for modulating the flow of hydraulic fluid in said actuator system;
   ram position sensing means providing an output signal indicative of the instantaneous position of said ram;
   control means responsive to said position-indicative output signal for generating a ram profile command signal;
   tachometer means cooperatively associated with said ram for providing a velocity signal indicative of the velocity of said ram; and
   means for combining said velocity signal with said command signal to develop a control signal for application to said servo valve whereby said ram is positioned in accordance with said ram profile command signal.

2. A press brake in accordance with claim 1 further comprising amplifier means for generating said analog control signal, said amplifier including said means for combining said ram profile command signal and said velocity signal.

3. A press brake in accordance with claim 1 further comprising ram tilt control means comprising means for sensing ram tilt and generating a ram tilt signal indicative of the degree of ram tilt, said combining means also being operative to combine said ram tilt signal with said ram profile command signal and said velocity signal, to generate a single resultant analog signal for application to said servo valve.

4. A press brake as defined in claim 1 including a back gauge movable along a defined operating path, and wherein said actuator and control system automatically positions said back gauge in a predetermined position and includes:
   drive means for driving said ram along said operating path at a velocity dependent on an applied control signal;
   back gauge sensing means providing an output signal indicative of the instantaneous position of said back gauge; and
   back gauge control means responsive to said back gauge and ram position-indicative output signals for generating a back gauge velocity command signal for application to said drive means whereby said back gauge is moved to a predetermined position.

5. A press brake as defined in claim 4 wherein said ram position sensing means comprise a rack member mounted for reciprocative movement, at least one transducer having a rotary shaft input, means including a gear coupling said shaft to said rack for rotation with linear movement thereof, and means for coupling said rack for movement with said ram.

6. In a press brake of the type having a frame, a bed and a ram constrained to reciprocate along a defined operating path toward and away from said bed, a control and actuator system for moving said ram from a first position to a second predetermined position along said operating path, comprising, in combination:
   drive means for driving said ram along said operating path in response to a plurality of applied analog control signals, said drive means comprising a hydraulic actuator system adapted to drive each end of said ram including at least one proportional servo valve in said hydraulic system associated with each end of said ram, each servo valve being proportionally responsive to selected of ones of said analog control signals,
   ram position sensing means providing an output signal indicative of the instaneous position of said ram,
   control means responsive to said position-indicative output signal for generating a ram profile command signal,
   ram tilt sensing means for detecting the degree of ram tilt and generating a signal indicative thereof,
   means for combining said ram profile command signal and said ram tilt signal to develop at least two analog control signals for selective application to said proportioning servo valves, said analog control signals providing for ram tilt correction by simultaneous and opposite compensation at said servo valves associated with the respective ends of said ram.

7. A press brake in accordance with claim 6 in which said means for combining said signals comprises first and second differential amplifiers each having inverted and non-inverted inputs and each developing an analog control signal for application to selected ones of said servo vales associated with the ends of said ram, said ram tilt sensing means includes a first position sensing means associated with one end of said ram and a second position sensing means associated with the other end of said ram, each of said position sensing means generating a signal indicative of the position of the respective end of said ram, said signal of said first sensing means being applied to the inverting input of said first amplifier and the non-inverting input of said second amplifier, and the signal of said second sensing means being applied to said non-inverting input of said first amplifier, and the inverting input of said second amplifier, whereby said two analog control signals are developed by opposite modification of said ram profile command signal by said ram tilt signal for simultaneous and opposite compensation of ram tilt at said proportioning servo valves.

8. In a press brake of the type having a frame, a bed, a ram constrained to reciprocate along a defined linear operating path toward and away from said bed and at least one transducer element having rotary shaft input for measuring selected of the characteristics of said ram's motion, the improvement comprising:
a rack gear carried by said ram along said defined linear path,
a support member mounted on said bed,
said transducer element being carried by said support member adjacent said rack gear, said rotary shaft input of said transducer element being cooperatively engaged with said rack gear so that linear motion of said rack gear is translated into rotary motion of said transducer element for measurement of said selected characteristic.

9. A press brake in accordance with claim 8 which comprises a plurality of transducer elements for measuring a plurality of the characteristics of said ram's motion, all of said transducer elements being mounted on said support member and in cooperative engagement with said rack gear whereby the linear motion of the single rack gear is translated into rotary motion of a plurality of transducer elements for measuring a plurality of the characteristics of said ram's motion.

10. A press brake in accordnce with claim 8 in which said rack gear is carried by a resilient support means to isolate said rack gear from any non-linear movement of said ram.

11. A press brake in accordance with claim 10 in which said resilient support means includes a linkage with at least one swivel joint.

12. A press brake in accordance with claim 8 in which said support member is free of attachment to said frame to isolate said transducer elements from any torsion or twisting of said frame.

13. A press brake in accordance with claim 8 in which said transducer is carried on a support plate which is movably mounted on said support member, said press brake including spring means biasing said support plate for positive engagement between the rotary input of said transducer element and said rack gear.

14. In a press brake of the type having a frame, a bed, a ram constrained to reciprocate along a defined linear operating path toward and away from said bed and at least one transducer having a rotary shaft input for measuring selected of the characteristics of said ram's motion, the improvement comprising:
a rack gear carried by said ram along said defined linear path,
mounting means for resiliently mounting said rack gear to said ram,
a support member mounted on said bed independently of said frame,
said transducer being carried by said support member adjacent said rack gear, said rotary shaft input of said transducer being cooperatively engaged with said rack gear so that linear motion of said rack gear is translated into rotary motion of said transducer, said independent support member and resilient mounting means cooperating to isolate said rack gear and transducer from warping of the ram or frame during pressing.

15. A press brake in accordance with claim 14 in which said resilient mounting means comprises a linkage including at least one swivel joint to isolate said rack gear from any non-linear movement of said ram.

16. A press brake in accordance with claim 14 in which said transducer is carried by a support plate which is movably mounted on said support member, and spring means associated with the support plate biases the movable plate for positive engagement between the rack gear and the transducer.

17. A press brake in accordance with claim 14 in which said rack gear includes a pair of opposed runners for engagement between a plurality of facing guide rollers carried on said independent support member.

* * * * *

UNITED STATES PATENT AND TRADEMARK OFFICE
CERTIFICATE OF CORRECTION

PATENT NO. : 4,148,203
DATED : April 10, 1979
INVENTOR(S) : Assadollah Farazandeh and Buford R. Everett It is certified that error appears in the above-identified patent and that said Letters Patent are hereby corrected as shown below:

column 3, line 33, "able" should be --cable-- column 4, line 10, "60" should be --50-- column 6, line 47, "titled" should be --tilted-- column 11, line 34, "servo-vale" should be --servo-valve-- column 12, line 55, "vales" should be --valves-- column 13, line 28, "accordnce" should be --accordance--

Signed and Sealed this

Second Day of October 1979

[SEAL]

Attest:

RUTH C. MASON
*Attesting Officer*

LUTRELLE F. PARKER
*Acting Commissioner of Patents and Trademarks*